US009657820B1

(12) United States Patent
Hsieh et al.

(10) Patent No.: US 9,657,820 B1
(45) Date of Patent: May 23, 2017

(54) BALL SCREW WITH MAINTENANCE DEVICE

(71) Applicant: HIWIN TECHNOLOGIES CORP, Taichung (TW)

(72) Inventors: Chin-Wen Hsieh, Taichung (TW); Shang-Hua Tsai, Taichung (TW); Ren-Yuan Chen, Taichung (TW); Ming-Che Kuo, Taichung (TW); Zong-Sian Jiang, Taichung (TW)

(73) Assignee: HIWIN TECHNOLOGIES CORP, Taichung (TW)

( * ) Notice: Subject to any disclaimer, the term of this patent is extended or adjusted under 35 U.S.C. 154(b) by 0 days.

(21) Appl. No.: 15/144,824

(22) Filed: May 3, 2016

(51) Int. Cl.
| | | |
|---|---|---|
| *F16H 1/24* | (2006.01) | |
| *F16H 55/02* | (2006.01) | |
| *F16H 25/22* | (2006.01) | |
| *F16H 57/04* | (2010.01) | |

(52) U.S. Cl.
CPC ..... *F16H 25/2214* (2013.01); *F16H 57/0497* (2013.01)

(58) Field of Classification Search
CPC ............. F16H 25/2214; F16H 57/0497; F16H 25/2223
USPC ............................................ 74/424.86, 89.44
See application file for complete search history.

(56) References Cited

U.S. PATENT DOCUMENTS

| | | | | |
|---|---|---|---|---|
| 5,373,755 A | * | 12/1994 | Rohlinger | F16H 25/2214 74/424.86 |
| 6,568,508 B2 | * | 5/2003 | West | F16H 25/2214 184/5 |
| 2003/0145670 A1 | * | 8/2003 | Fujita | F16C 33/3706 74/89.44 |
| 2012/0017713 A1 | * | 1/2012 | Miyahara | F16H 25/2214 74/424.86 |

* cited by examiner

*Primary Examiner* — David M Fenstermacher
*Assistant Examiner* — Jake Cook
(74) *Attorney, Agent, or Firm* — Leong C. Lei

(57) ABSTRACT

A ball screw with maintenance device includes a screw shaft including a helical rolling groove; a nut having an outer circumferential surface in which at least two mounting holes is formed; two recirculation elements, which are mounted to the nut and each having a through hole having an open end set in a spacing distance from the rolling groove; a fixing cover mounted to the outer circumferential surface of the nut and includes a concentration trough formed therein. The through hole has an end communicating with the concentration trough. The concentration trough is connectable to a suction tube or an oil/grease supply tube. The suction tube can remove contamination from the interior of the nut through the through hole, and the part that has been cleaned up with the suction tube can be replenished with fresh oil/grease with the oil/great supply tube to achieve complete maintenance of the ball screw.

7 Claims, 5 Drawing Sheets

BALL SCREW WITH MAINTENANCE DEVICE

(a) TECHNICAL FIELD OF THE INVENTION

The present invention relates generally to a linear transmission device, and more particularly to a ball screw with maintenance device.

(b) DESCRIPTION OF THE PRIOR ART

A ball screw is generally made up of a nut that matches a screw shaft by means of balls that are free to rotate therebetween such that the nut is slidable with respect to the screw by means of the rolling of the balls. Due to excellent smoothness and accuracy, the ball screw has been widely used in all sorts of machinery that requires accuracy of movement, such as those involved in micromachining and semiconductor processes. Consequently, lubrication of helical raceways is vital. However, long lacking of proper lubrication for a ball screw would lead to an increase of friction between the nut and the screw shaft and thus speed up wear and abrasion of the ball screw.

To effectively reduce the wear and abrasion of the ball screw resulting from friction, known lubrication systems for ball screws generally belong to two categories, of which the first one involves an external lubrication system that feeds lubricant grease between the nut and the screw shaft by a grease tube, wherein the characteristic of high viscosity of the lubricant grease (which is made by adding a thickening agent in lubricant oil so as to thicken the lubricant oil and turn into lubricant grease) helps persistently keep the lubricant grease inside the nut to provide an effect of lubrication. However, the lubricant oil that makes up the lubricant grease would be consumed after being use for a while, while the thickening agent is left inside the nut. Without properly removing the used lubricant grease out of the nut and replenishing fresh lubricant grease, the thickening agent of the lubricant grease would continuously accumulate, leading to poor heat dissipation and accumulation of metal chips. In addition, the lubrication system has to be maintained in a standby condition and this causes waste of energy.

The second category of lubrication system includes solid lubricant arranged at an end of the nut such that the solid lubricant is in contact with a surface of the screw shaft for lubricant the thread of the screw shaft in order to achieve lubrication of the ball screw. However, the solid lubricant provides on relatively poor lubrication and insufficient lubrication may result sometimes so as to cause damage to the ball screw. In addition, the lubricant accumulated inside the nut cannot be removed so that heat accumulation may result and affect the operation of the ball screw.

In light of the above, the conventional ways of lubrication are achieved by continuously adding lubricant oil (grease), but not removing the used lubricant oil (grease). This greatly deteriorates the effect of lubrication and thus reduce accuracy of the ball screw and shorten the lifespan thereof. Thus, further improvements are necessary.

SUMMARY OF THE INVENTION

In view of the above problems, the primary object of the present invention is to provide a device for removing contamination from the interior of a nut of a ball screw in order to clean up the interior of the nut and replenish fresh lubricant.

To achieve the above object, the present invention provides a ball screw with maintenance device, which comprises: a screw shaft, which has an outer circumferential surface in which a rolling groove is formed; a nut, which comprises a bore formed therein to receive extension of the screw shaft therethrough, the bore having an inner surface in which a rolling channel is formed and corresponds to the rolling groove, the rolling groove and the rolling channel collectively constituting a loading path, the rolling groove and the rolling channel receiving a plurality of rolling elements arranged therebetween, the nut having an outer circumferential surface in which at least two mounting holes is formed, the two mounting holes being in communication with the bore; two recirculation elements, each of which has an outside configuration in the form of an L-shape comprising a coupling section and a guide section, the recirculation elements each comprising a recirculation passage extending through the coupling section and the guide section, the guide sections being respectively inserted into the mounting holes, such that the recirculation passages are jointed to the loading path, the guide sections being each provided, at one side thereof opposing the rolling groove, with a nail, the coupling section of one of the recirculation elements being coupled to the coupling section of the other one of the recirculation elements to allow the recirculation passages of the two recirculation elements to collectively form a circulation track, the circulation track being arranged for circulation of the rolling elements, the nail guiding the rolling elements into the circulation track; the guide sections being each provided with a through hole in a surface opposing the rolling groove such that an open end of the through hole is set at a spacing distance from the rolling groove; and a fixing cover, which is mounted to the outer circumferential surface of the nut and comprises a retention trough and a concentration trough formed therein, the retention trough being set on and covering the two recirculation elements, the through hole having an opposite end in communication with the concentration trough.

Preferably, an elastic gasket is arranged between the outer circumferential surface of the nut and the fixing cover.

Preferably, the recirculation elements are each provided, at a location close to the nail, with a wiper board facing and projecting towards the rolling groove to be in contact engagement with the rolling groove.

Preferably, the wiper board is in the form of a V-shape or a U-shape.

Preferably, the concentration trough is connectable to a suction tube or an oil/grease supply tube.

Preferably, the spacing distance is in the range from 0.2 mm to 1 mm and more preferably from 0.3 mm to 0.6 mm.

The present invention makes use of a suction tube that is connected to the concentration trough to allow contamination to be removed out of the interior of the nut by means of the arrangement of a through hole and the part that has been cleaned up with the suction tube can be replenished with fresh of/grease with an oil/great supply tube to achieve complete maintenance of the ball screw.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
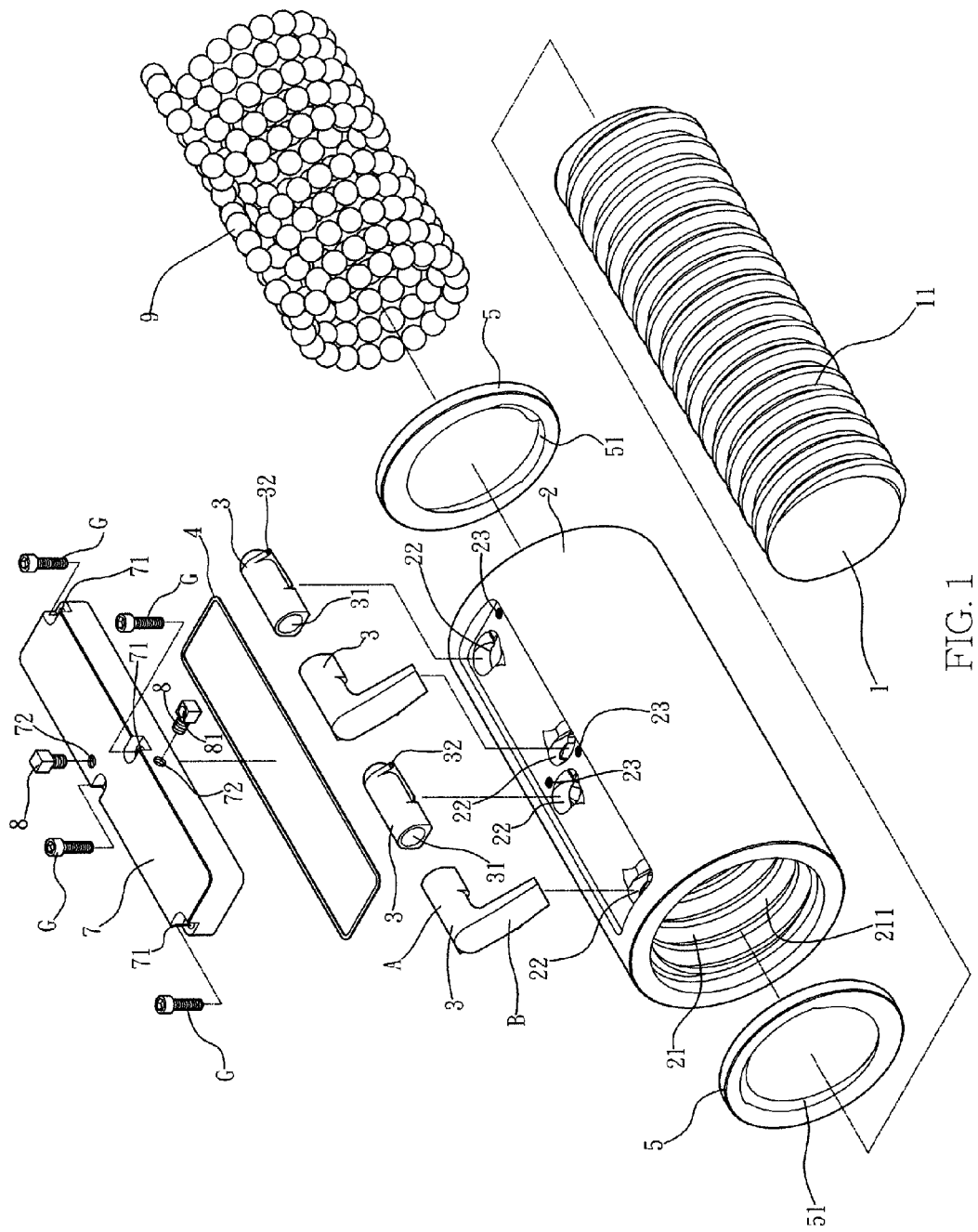
FIG. 1 is an exploded view illustrating a ball screw with maintenance device according to the present invention.
Figure 2:
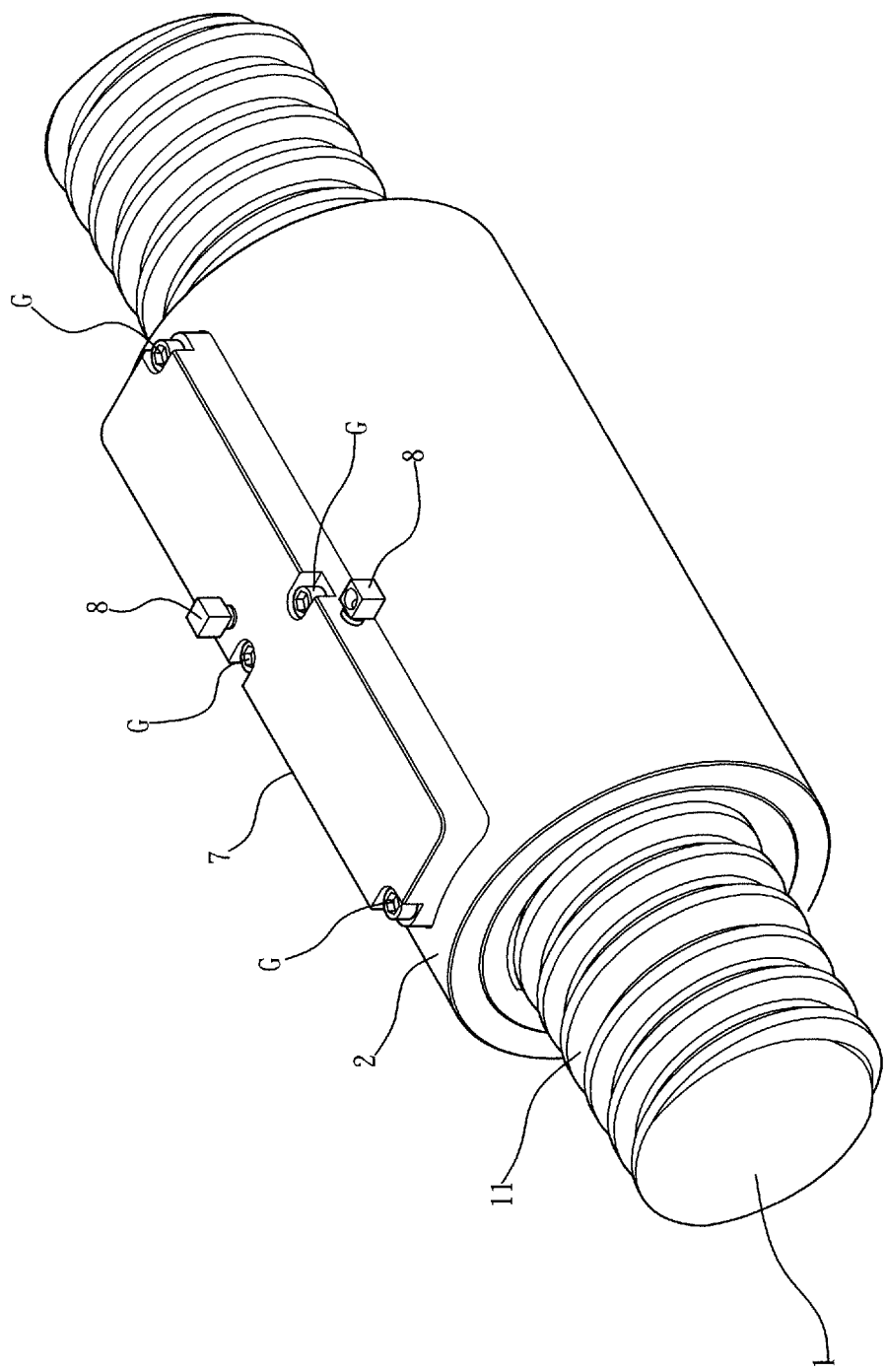
FIG. 2 is an assembled view of the ball screw with maintenance device according to the present invention.

Referring to FIGS. 1-5, the present invention provides a ball screw with maintenance device, which comprises: a screw shaft (1), which has an outer circumferential surface in which a helical rolling groove (11) is formed; and a nut (2), which comprises a bore (21) formed therein to receive extension of the screw shaft (1) therethrough. The bore (21) has an inner circumferential surface in which a rolling channel (211) is formed and corresponds to the rolling groove (11). The rolling groove (11) and the rolling channel (211) collectively constitute a loading path (90). The rolling groove (11) and the rolling channel (211) receive a plurality of rolling elements (9) arranged therebetween. The bore (21) has two opposite ends to each of which a closure ring (5) in an annular form is mounted. The closure rings (5) each comprise a lip (51) in contact engagement with an outer surface of the screw shaft (1). The nut (2) has an outer circumferential surface in which at least two mounting holes (22) is formed. In the instant embodiment, the nut comprises four mounting holes (22), and the four mounting holes (22) are in communication with the bore (21). In the instant embodiment, four recirculation elements (3) are provided to respectively correspond to the mounting holes and each has an outside configuration in the form of an L-shape comprising a coupling section (A) and a guide section (B). The recirculation elements (3) each comprise a recirculation passage (31) extending through the coupling section (A) and the guide section (B). The guide section (B) is inserted into the corresponding mounting hole (22), such that the recirculation passage (31) is jointed with the loading path (90). The guide section (B) is provided, at one side thereof opposing the rolling groove (11), with a nail (33). The recirculation elements are arranged in pair such that the coupling section (A) of one recirculation element (3) is coupled to the coupling section (A) of the other one recirculation element (3) to allow the recirculation passages (31) of the two recirculation elements (3) to collectively form a circulation track for circulation of the rolling elements (9). The nail (33) functions to guide the rolling elements (9) into the circulation track. The guide section (B) is provided with a through hole (32) in a surface opposing the rolling groove (11). The through hole (32) has an open end that is set at a spacing distance (P) from the rolling groove (11). The spacing distance (P) is in the range from 0.3 mm to 1 mm, and preferably from 0.3 mm to 0.6 mm. A fixing cover (7) is mounted to the outer circumferential surface of the nut (2). The fixing cover (7) comprises a plurality of through holes (71) formed therein and the nut (2) is provided with bolt holes (23) respectively corresponding to the through holes (71), such that a plurality of bolts (G) is received through the through holes (71), respectively, and screwed into and fastened to the bolt holes (23) to thereby fix the fixing cover (7) to the outer circumferential surface of the nut (2). The fixing cover (7) comprises a retention trough (74) and a concentration trough (73) formed therein. The retention trough (74) is set on and covers two recirculation elements (3). The through hole (32) has an opposite open end that communicates with the concentration trough (73). To improve sealing of the concentration trough (73), in the instant embodiment, as elastic gasket (4) is arranged between the outer circumferential surface of the nut (2) and the fixing cover (7). The fixing cover (7) is additionally provided with at least one bolt hole (72) in communication with the concentration trough (73). The bolt hole (72) receives a connector (8) to be disposed therein. The connector (8) comprises a passageway (81) formed therein. The passageway (81) has an end communicating with the concentration trough (73) and an opposite end for connection with a suction tube or an oil supply tube. In the instant embodiment, as shown in FIG. 2, two connectors (8) are provided and arranged adjacent to each other. This arrangement provides an effect that one of the connectors (8) is connectable to the suction tube, with a distal end of the suction tube connected to a negative pressure machine, so that when the negative pressure machine is activated, a suction force is generated and transmitted through the suction tube to the concentration trough (73) (wherein, generally, the ball screw is also set in operation at the same time to have the nut reciprocally move with respect to the screw shaft), whereby contamination or grease located in the loading path (90) can be sucked and drawn, through the through hole (32), into the concentration trough (73) and then, conducted through the suction tube into the negative pressure machine. On the other hand, the other one of the connectors (8) that is arranged adjacent to the previous connector (8) so that said other one connector (8) can be connected to an oil supply tube to feed oil/grease into the loading path (90) to be coated thereon, whereby maintenance of ball screw can be completed in a short period of time. Such a purpose can also be achievable with one single connector (8); however, the operation time would be extended and longer than that required by using two connectors.

Figure 3:
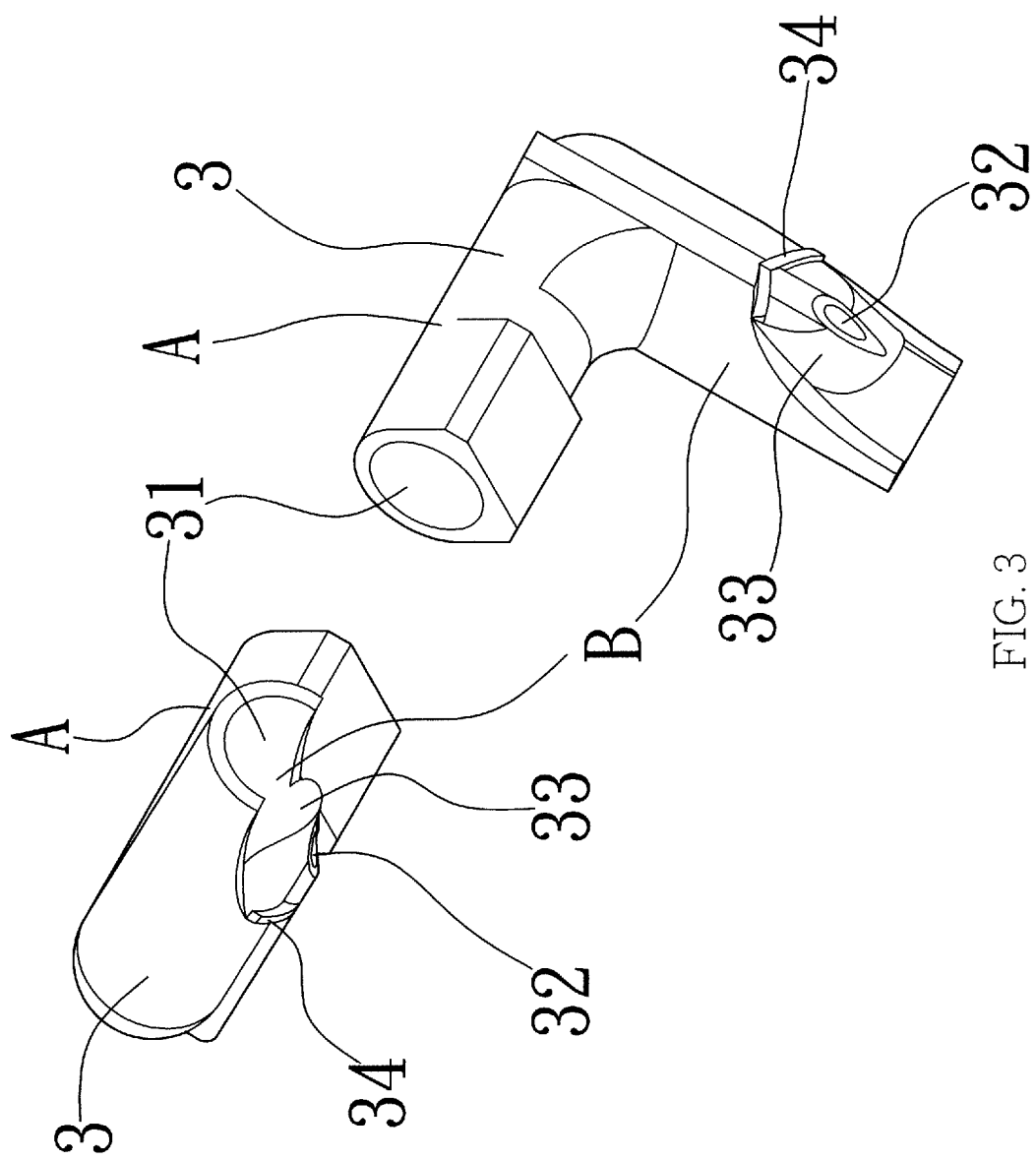
FIG. 3 is an exploded view illustrating a recirculation element of the ball screw with maintenance device according to the present invention.
Figure 4:
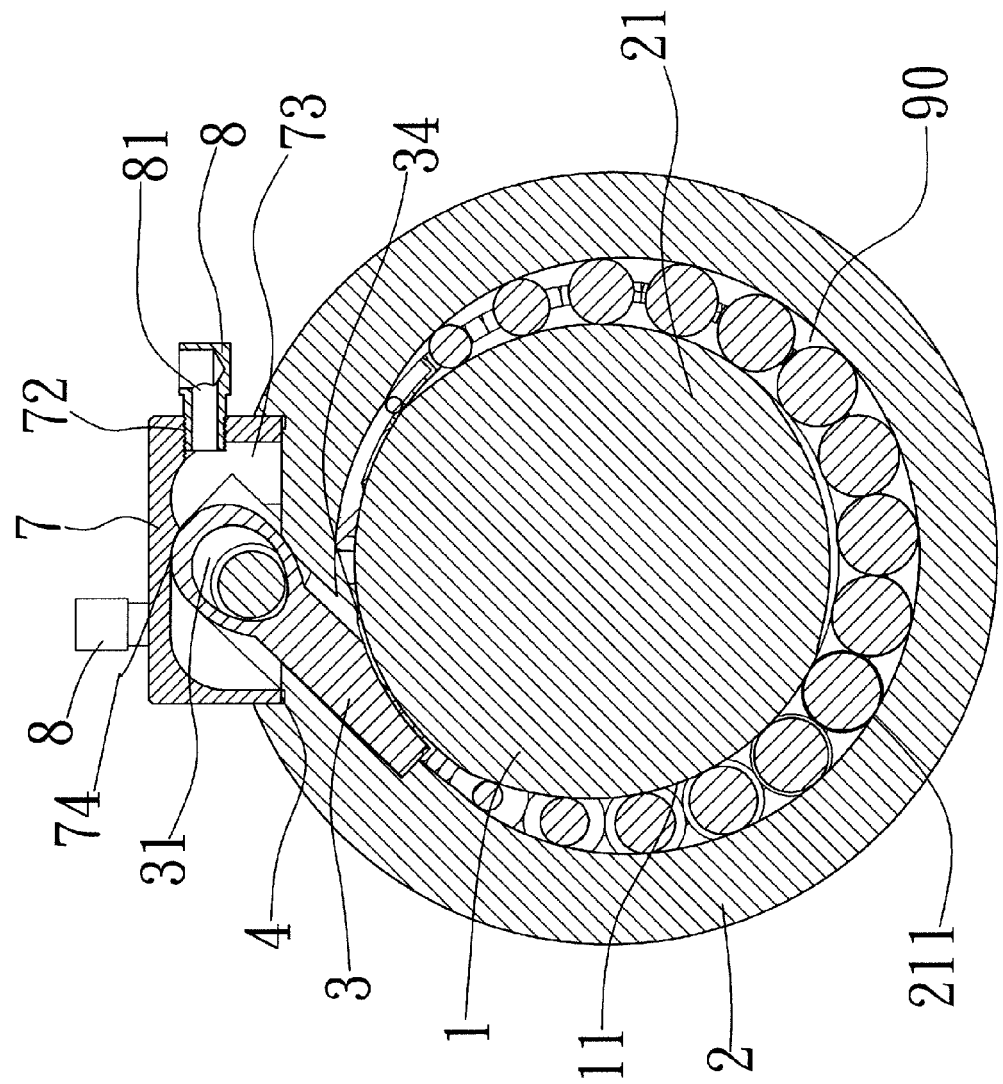
FIG. 4 is a cross-sectional view of the ball screw with maintenance device according to the present invention, generally illustrating a collaborative arrangement between a connector and a concentration trough.
Figure 5:
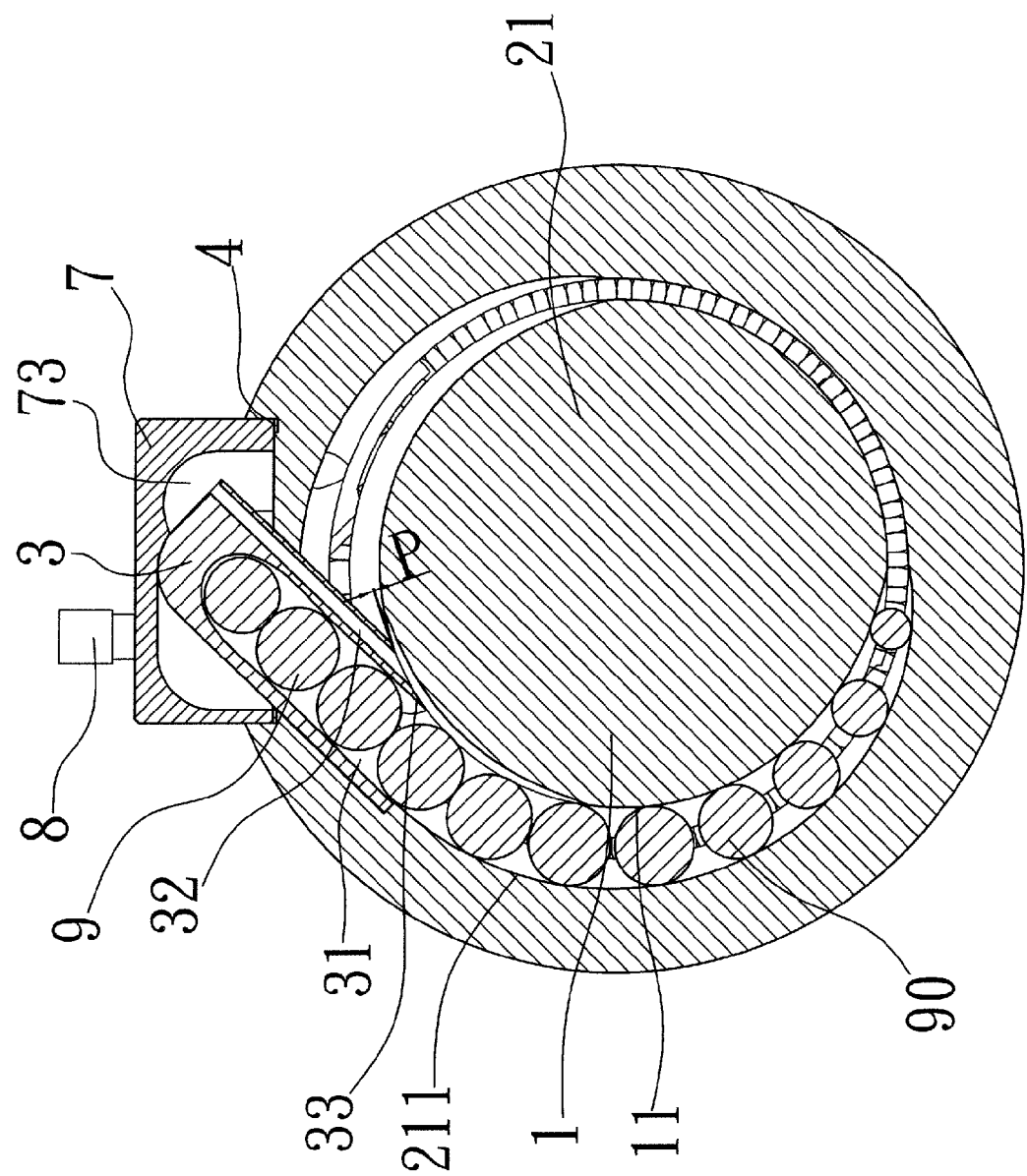
FIG. 5 is a cross-sectional view of the ball screw with maintenance device according to the present invention, generally illustrating a collaborative arrangement between a through hole and a concentration trough.

As shown in FIGS. 3 and 4, to allow the through hole (32) to sufficiently discharge or remove contamination and/or oil/grease from the loading path (90), in the instant embodiment, each of the recirculation elements (3) is provided, at a location close to the nail (33), with a wiper board (34) that faces and projects toward the rolling groove (11) to be in contact engagement with the rolling groove (11). The wiper board (34) is in the form of a V-shape or U-shape. The arrangement of the wiper board (34) allows contamination and/or oil/grease to be concentrated around the through hole (32) to be efficiently transferred through the through hole (32) to the concentration trough (73).

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A ball screw with maintenance device, comprising: a screw shaft, which has an outer circumferential surface in which a rolling groove is formed; a nut, which comprises a bore formed therein to receive extension of the screw shaft therethrough, the bore having an inner surface in which a rolling channel is formed and corresponds to the rolling groove, the rolling groove and the rolling channel collectively constituting a loading path, the rolling groove and the rolling channel receiving a plurality of rolling elements arranged therebetween, the nut having an outer circumferential surface in which at least two mounting holes is formed, the two mounting holes being in communication with the bore; two recirculation elements, each of which has an outside configuration in the form of an L-shape comprising a coupling section and a guide section, the recirculation elements each comprising a recirculation passage extending through the coupling section and the guide section, the guide sections being respectively inserted into the mounting holes, such that the recirculation passages are jointed to the loading path, the guide sections being each provided, at one side thereof opposing the rolling groove, with a nail, the coupling section of one of the recirculation elements being coupled to the coupling section of the other one of the recirculation elements to allow the recirculation passages of the two recirculation elements to collectively form a circulation track, the circulation track being arranged for circulation of the rolling elements, the nail guiding the rolling elements into the circulation track; the guide sections being each provided with a through hole in a surface opposing the rolling groove such that an open end of the through hole is set at a spacing distance from the rolling groove; and a fixing cover, which is mounted to the outer circumferential surface of the nut and comprises a retention trough and a concentration trough formed therein, the retention trough being set on and covering the two recirculation elements, the through hole having an opposite end in communication with the concentration trough.

2. The ball screw with maintenance device according to claim 1, wherein an elastic gasket is arranged between the outer circumferential surface of the nut and the fixing cover.

3. The ball screw with maintenance device according to claim 1, wherein the recirculation elements are each provided, at a location close to the nail, with a wiper board facing and projecting towards the rolling groove to be in contact engagement with the rolling groove.

4. The ball screw with maintenance device according to claim 3, wherein the wiper board is in the form of a V-shape or a U-shape.

5. The ball screw with maintenance device according to claim 4, wherein the concentration trough is adapted to connect to a suction tube or an oil/grease supply tube.

6. The ball screw with maintenance device according to claim 1, wherein the spacing distance is in the range from 0.2 mm to 1 mm.

7. The ball screw with maintenance device according to claim 6, wherein the spacing distance is in the range from 0.3 mm to 0.6 mm.

* * * * *